April 19, 1927.
G. T. JOHNSON
1,625,259
BALANCING MACHINE
Filed Sept. 1, 1920
4 Sheets-Sheet 1
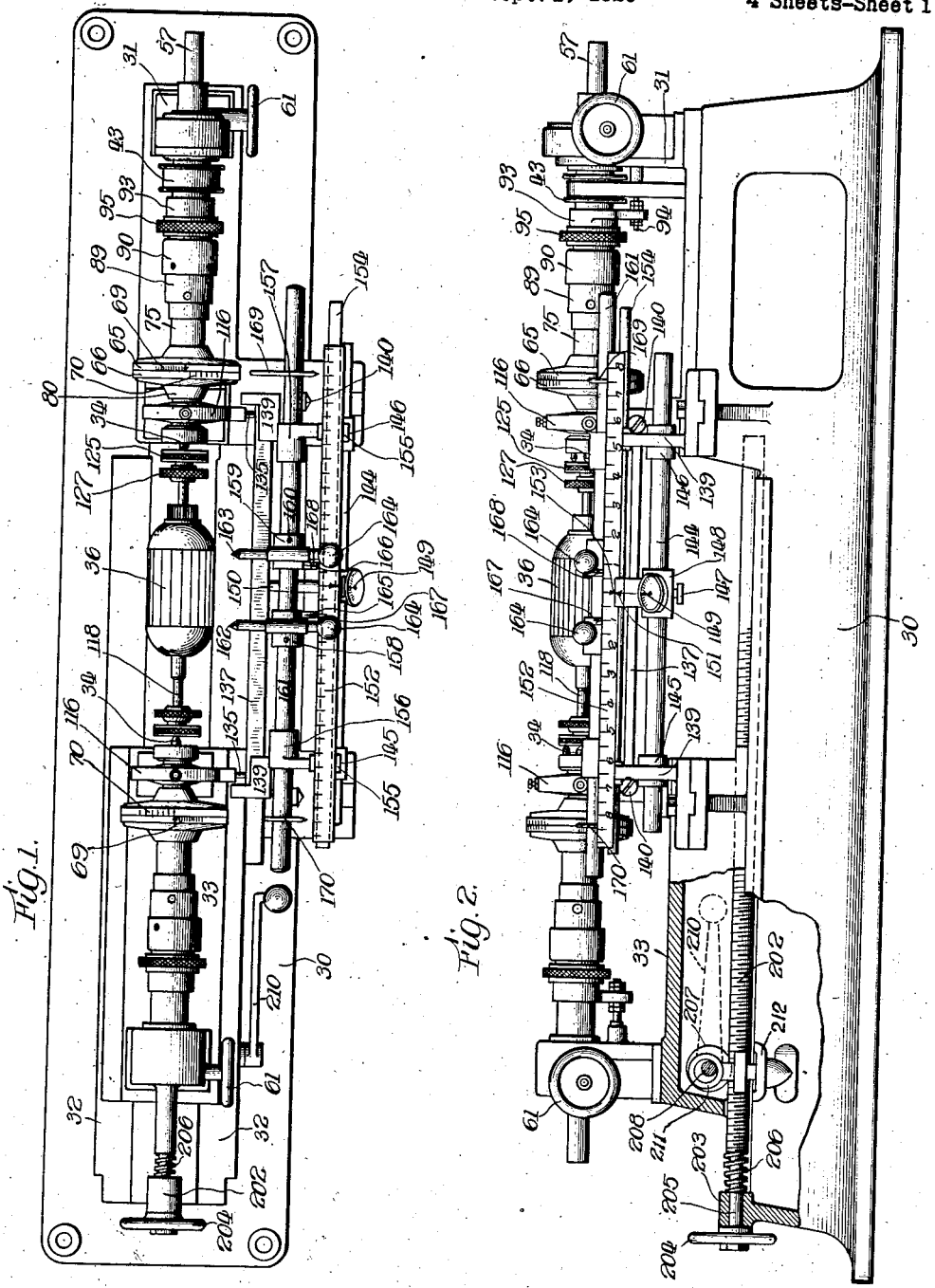
Witness:
A. J. Sauser
Inventor:
Gustave T. Johnson
By Walter M. Fuller
Atty.

April 19, 1927.
G. T. JOHNSON
BALANCING MACHINE
Filed Sept. 1, 1920
1,625,259
4 Sheets-Sheet 2
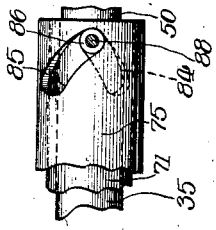
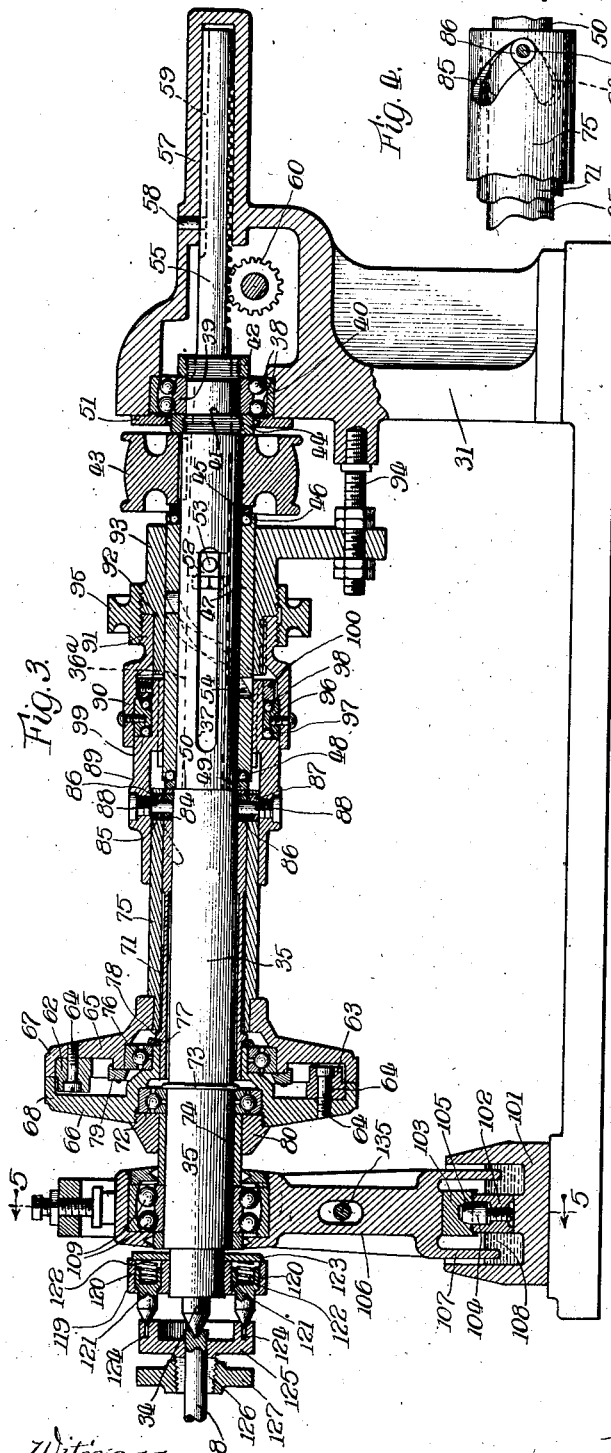
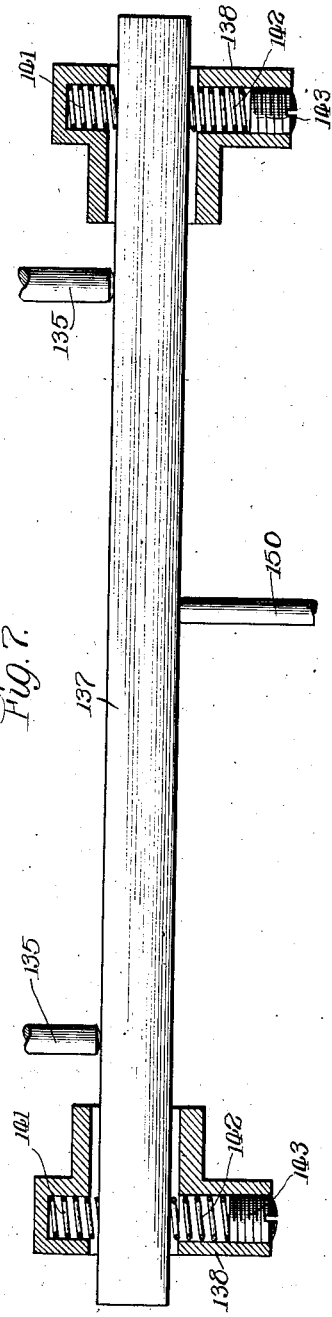
Inventor:
Gustav T. Johnson
By Walter M. Fuller
Atty April 19, 1927.

G. T. JOHNSON

BALANCING MACHINE

Filed Sept. 1, 1920

Witness:
A. J. Sauser

Inventor.
By Gustav T. Johnson
Walter M. Fuller
Atty.

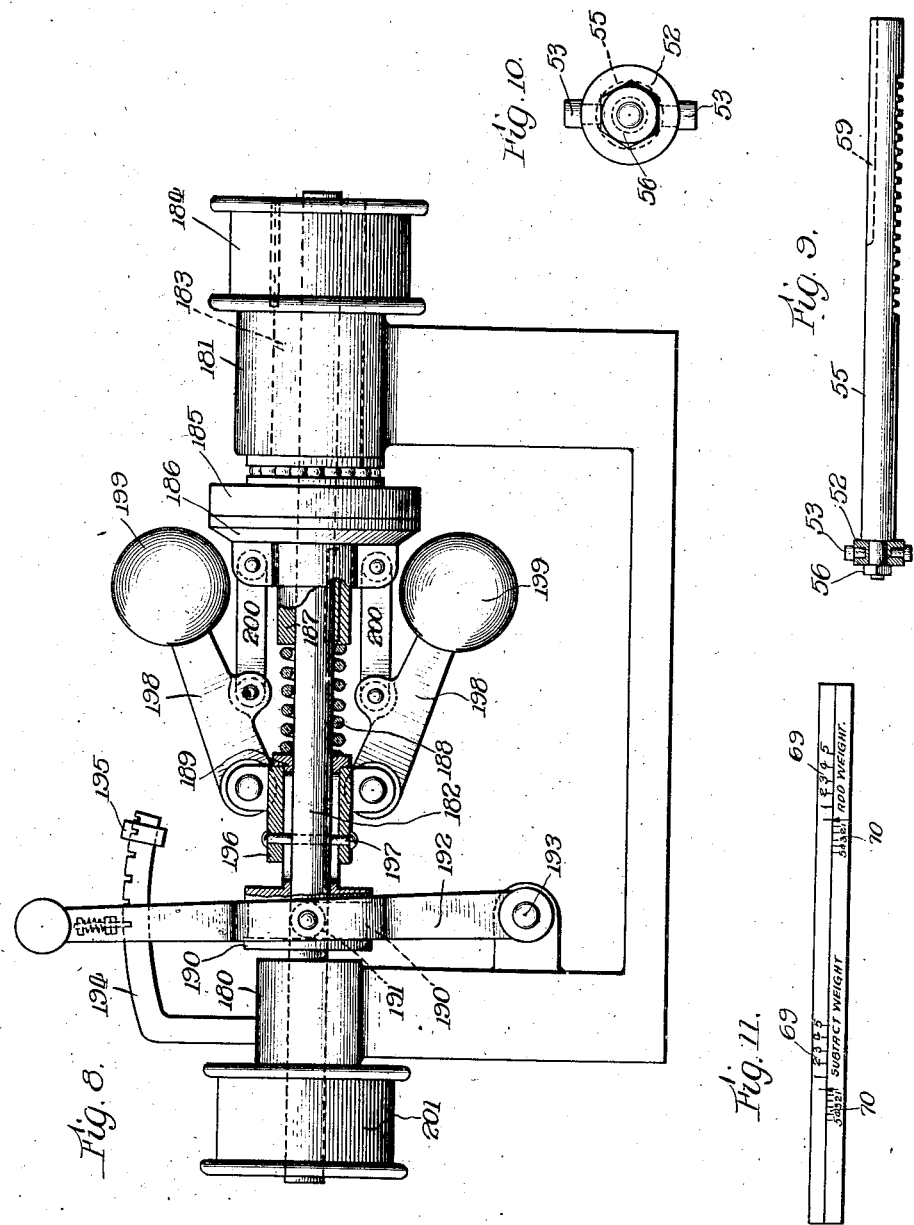

Patented Apr. 19, 1927.

1,625,259

UNITED STATES PATENT OFFICE.

GUSTAVE T. JOHNSON, OF CHICAGO, ILLINOIS.

BALANCING MACHINE.

Application filed September 1, 1920. Serial No. 407,431.

My invention relates to machines for ascertaining the amounts and positions of weights necessary to be added to or removed from an unbalanced revoluble body to put it in dynamic balance, and preferably also at the same time in static balance. To this end a machine embodying the invention is provided with shiftable or adjustable test weights, which are employed to balance the body while rotating and from the determinations incident to such balancing of the body, the weights needed to be added to or subtracted from the body and their proper locations are readily found by suitable mathematical calculations.

One leading object of the invention is to provide an appliance of this character which is simple in structure and which at the same time will be extremely sensitive and accurate in the work which it performs. To reach this result I employ what I believe to be an entirely new principle in machines of this character. Namely, I use a pendulum-structure and subject the same to the periodic action or impulses of the unbalanced weight of the body being tested in such a way that they set up and increasingly augment the vibrations or oscillations of the pendulum-appliance, whereby an extremely small unbalanced weight may be detected because of its cumulative effect on the pendulum. Accordingly, the unbalanced body is rotated at a speed in synchronism or harmony with the natural period of vibration or oscillation of the pendulum, so that the repeated influences of the weight on the pendulum in time set up a substantial vibration of the latter which may be easily detected and the cause remedied.

The action of the pendulum-structure is in no substantial respect dependent upon or influenced by the weight of the body subjected to the test and accordingly this type of machine is far superior to those using one or more springs wherein the period of vibration of the spring varies with the weight imposed upon it.

In the new appliance of this invention the body undergoing test is mounted so that its opposite ends are free to wabble or gyrate independently of one another and the two ends are balanced to neutralize such tendency to wabbly movement. Also the longitudinal center around which the unbalanced weights of the body tend to turn is ascertained and employed in determining the amounts and positions of the weights to be added to or removed from the body to balance it.

Many other features of the invention and their various advantages will be made plain from the following detailed description of a preferred embodiment of the invention which is illustrated in the accompanying drawings forming a part of this specification and throughout the several views of which like reference characters refer to the same parts.

In these drawings:

Figure 1 is a plan view of the appliance;

Figure 2 is a front elevation of the same with parts broken away;

Figure 3 is a longitudinal, central, vertical section through the right-hand balancing mechanism;

Figure 4 is a fragmentary detail of two slotted sleeves and the shaft on which they are mounted;

Figure 7 is a horizontal fragmentary section showing the vibratory flat bar subjected to the oscillatory movements of the two pendulum systems;

Figure 8 shows partly in elevation and partly in section the drive mechanism and its speed control;

Figure 9 illustrates the sliding rack used to adjust the test weights;

Figure 10 is an enlarged end view of the same; and

Figure 11 is a development of the graduated surfaces of the companion members carrying such weights.

Figure 6:
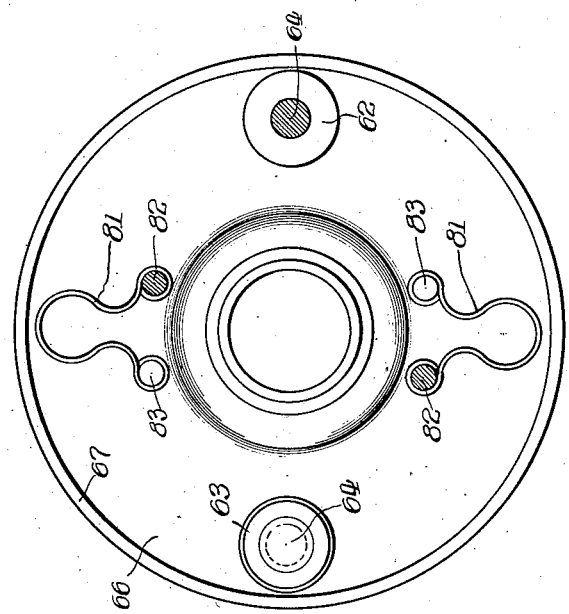
Figure 6 is an enlarged section through one of the test weight appliances.

Referring to these drawings, it will be seen that the improved and novel appliance comprises an elongated frame 30 (Figure 2) having a casting 31 fastened thereon at its right-hand end, the other end of the frame having opposed longitudinal guides 32, 32 (Figure 1) on which a slide or carriage 33 is lengthwise adjustable by means described in detail hereinafter. These two parts 31 and 33 carry centers 34, 34 (Figures 1, 2 and 3) on which the body 36, such as an electric-motor armature, for example, to be tested and balanced, is supported.

The right-hand conical center 34 forms the left-hand end part of a shaft 35 (Figure 3) hollow for a portion of its length by reason of a concentric, cylindrical cavity 36ª, the opposite walls of which have registering lengthwise slots 37, 37 extended therethrough. At its right-hand end this shaft is supported and revoluble in a ball-bearing 38, the inner and outer races 39 and 40, respectively, of which are suitably curved permitting the left-hand part of the shaft to rock about the center of such bearing. The inner raceway of such bearing is held against a shoulder 41 of the shaft by a nut 42 screwed on to the externally-threaded end portion of the shaft.

Such shaft has a drive-pulley 43 keyed thereto and at one side thereof is a nut 44 screwed on the shaft and holding the pulley against a hardened thrust collar 45 fitted over the shaft and bearing on a ball-bearing 46, comprising loose balls accommodated in an annular recess in the adjacent end of a sleeve 47, which at its other end has a similar ball-bearing 48 coacting with a like thrust-collar 49 pressing against a similar shoulder 50 of the shaft. A dust-guard 51 protects the ball-bearing 38 in the manner clearly illustrated.

Sleeve 47 is free to turn on the shaft, but is forced or compelled to rotate with the shaft by reason of a round plug 52 (Figures 1, 9 and 10) fitting the interior of the shaft and having a pair of diametrically-opposite pins 53, 53 which extend out through the shaft slots 37, 37 into two spiral or helical grooves 54, 54 (Figure 3) in the sleeve of about one and one-quarter turns each. If, therefore, the collar 52 is caused to slide lengthwise in the shaft during their joint revolution, the sleeve will be turned angularly about the shaft on which it is mounted. To effect such adjustment travel of the plug, it is rotatably mounted on the reduced round end of a rack 55, being held on such bearing by a nut 56. Rack 55 does not rotate, but is mounted to slide coaxially with the shaft in a portion 57 (Figure 3) of the casting 31, being prevented from turning by a stationary pin 58 extending into a longitudinal groove 59 in the rack, the teeth on the lower edge of the latter being in mesh with those of a pinion 60 operable by an accessible handle or turning wheel 61 (Figures 1 and 2).

By manipulating the handle, thereby shifting the otherwise stationary rack lengthwise and moving its rotating plug longitudinally in the revolving shaft, the sleeve 47, rotating with the shaft by reason of the pins which lock them together, can be adjusted angularly during its rotation about the shaft to change the angular position of the two weights used to overcome or neutralize the unbalance of the tested body without changing the angular relation of such weights to one another, as will be fully explained hereinafter.

Such pair of equal weights 62 and 63 (Figures 3 and 6) in the same plane perpendicular to the axis of the shaft 35, by means of screws 64, are mounted on the inner, opposed faces of two, spaced, disc members 65 and 66 having mating flanges or circular rims 67 and 68, respectively. These elements 62 and 63 are of exactly the same weight, are located in the same plane transverse to the shaft, and are normally 180 degrees apart, as shown in Figure 3, whereby they are in exact static and dynamic or running balance. Mechanism is provided, however, for shifting these weight members angularly relatively to one another, the effect being as though a single unbalanced weight had been added to the shaft at a point midway between the two weights and of an amount dependent upon the extent of movement of such weights. By mechanism about to be described, this can be accomplished as the weights are revolving with the shaft, so that by such means a weight, adjustable as to amount, may, in effect, be mounted on the shaft without stopping the rotation of the latter.

It is also desirable or necessary to vary the angular position of such resultant weight on the shaft and this is accomplished by simultaneously revolving or turning both weights about the axis of the shaft while the latter is rotating without disturbing their relation to one another. Suitable mechanism is also provided to permit this result as detailed below.

The mating or registering flanges or rims 67 and 68 of the two members 65 and 66 are externally graduated at 69 and 70, respectively, (Figures 1 and 11), and bear legends disposed 180 degrees apart regarding adding or subtracting the weights, and it should be noted that the graduations 69 on the elements 65 are twice as fine as those on the other or companion element 66 for a purpose hereinafter indicated.

Disc or member 66 (Figure 3) is fixedly mounted on an inner elongated sleeve 71 on the shaft 35 and bears on a ball-bearing 72 on the shaft, the inner race of which is held between a shoulder 73 on the shaft and a spacing-sleeve 74 surrounding the shaft.

The companion disc 65 is fixedly mounted on an outer sleeve 75 surrounding the inner sleeve and co-operates with a ball-bearing 76 on the hub of element 66, and held in place by a collar 77 bearing against an enlargement 78 of the inner sleeve and by a collar 79 overlying the outer ball-race and secured to element 65.

Bearing 76 is covered and protected by the member 65 and bearing 72 by a collar 80 surrounding the spacing sleeve 74 and screwed into the hub-portion of element 66.

To automatically take up the slack or loose motion in the operating means for these two weights 62 and 63, the discs 65 and 66 are supplied with a pair of oppositely-disposed, balanced, bent springs 81 (Figure 6) each with two loop ends, one of each of which is secured to one disc by a pin 82, the other loop being fastened to the companion disc by a pin 83.

When the two weights 62 and 63 are directly opposite one another, they act as though no weight were present because they are exactly balanced. In order, therefore, to cause them to produce a resultant, unbalanced weight as specified, they are made capable of simultaneous and equal movements in opposite directions, whereby the resultant weight is always midway between them and varies in amount depending upon the extent of movement of such bodies.

This angular adjustment of the weights toward and from one another is effected through their respective supporting sleeves 71 and 75, and, accordingly, it is necessary to provide some means for turning these in opposite directions without interfering with their rotation with the shaft. Conformably the sleeves are provided with opposite spiral slots 84 and 85 (two opposite ones in each sleeve) extending around about one-sixth of the circumference of the corresponding sleeve, and positioned in such slots are rollers 86 and 87 on diametrically-opposite, inwardly-extended pins 88, 88 mounted in a sleeve 89 splined and longitudinally slidable on sleeve 47 and which consequently revolves with and at the same speed as the main-shaft 35. Encircling a part of sleeve 89 is another sleeve or collar 90 having an externally-threaded hub slidable lengthwise on and splined on a cylindrical barrel portion 92 of an externally-threaded member 93 fitted over the sleeve 47 and held against turning by a threaded stud 94 supported by the casting 31. The screw-threads of the elements 91 and 93 are of opposite pitch and coacting with them is a knurled-nut 95. Internally element 90 has a doubled-ended ball race 96 with two ball-thrust bearings 97 and 98 co-operating respectively with a shoulder 99 of sleeve 89 and a lock-nut 100 screwed on the threaded end of such sleeve.

By turning this relatively-stationary adjustment-nut 95, which may be done while the shaft and pair of weights are revolving, the longitudinal position of member 89 may be varied and its movement is transmitted through the pins and rollers 88, 86 and 87 to the sleeves 71 and 75 which turn in opposite angular directions because of their oppositely-inclined cam grooves in which the rollers fit and travel. Such turning of the supporting sleeves shifts the two weights equally and simultaneously in opposite directions as is required to test the balance or neutralize the unbalance of the body being tested. The vibration of the unbalanced shaft and body can be felt through the hand manipulating the nut.

Figure 5:
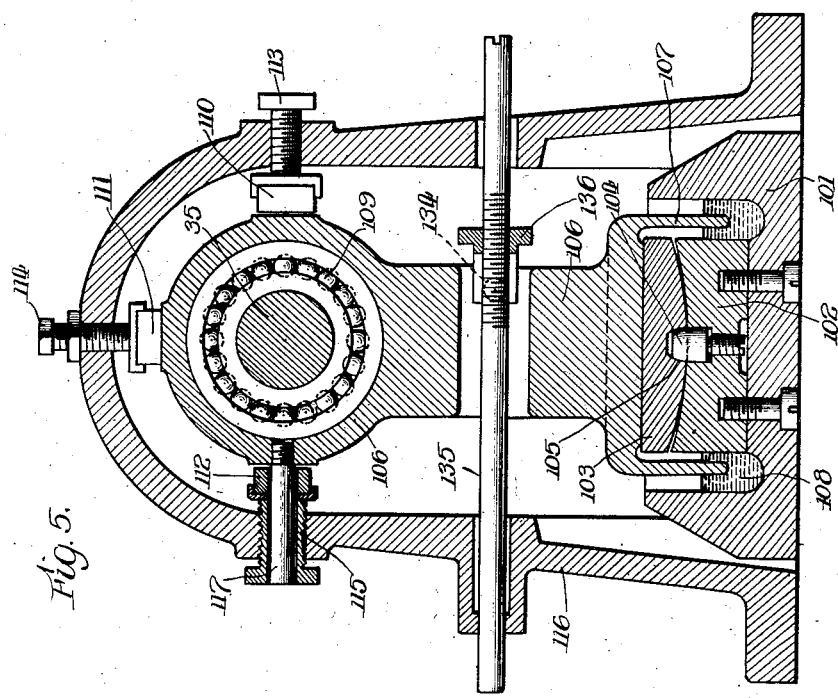
Figure 5 is a transverse section on an enlarged scale through one of the pendulum structures on line 5—5 of Figure 3.

The inner or left-hand end of shaft 35 is supported by a peculiar and novel pendulum-construction comprising a cup-shaped base 101 (Figures 3 and 5) mounted on or forming part of casting 31. Within this is secured a block 102 having a curved top face forming a part of a cylindrical surface. Mounted to oscillate on such block is a rock-plate 103 having a curved bottom face resting on the curved surface of block 102 and of a partial cylindrical curvature of a less radius than the co-acting face of block 102.

To assure a purely rocking or rolling movement of part 103 on element 102 without possibility of slippage or lateral bodily movement, the under element is supplied with a central single tooth 104 projecting into a properly-shaped cavity or recess 105 in the bottom face of member 103. This may be likened to a one-tooth internal and external gear and the curvature is the pitch line.

Mounted on plate 103 is an upright standard 106 having at it lower end a depending skirt or apron 107 extending into the cavity of member 101, the latter being partially filled with oil 108 to a level above the lower end of such skirt, thereby providing a dust-seal preventing the entrance of dirt or foreign matter to the companion rolling or rocking plates.

The upper portion of such standard is fitted with a ball-bearing 109 which supports the shaft 35 and the vibrations of the shaft and standard are limited as to extent by a plurality of adjustable rubber-bumpers 110, 111, 112 mounted on the inner ends of screws 113, 114 and 115 extended through the walls of a suitably-mounted yoke or arched member 116 on casting 31. Screw 115 and its buffer 112 are hollow to accommodate a rod 117 threaded into the standard 106 opposite the axis of the shaft and terminating flush with the outer end or external face of the screw, whereby by placing an indicator or the thumb or finger on both at the same time the slightest and most minute vibration or movement of the standard and shaft may be readily detected.

Shaft 118 of the body being tested is supported on the right-hand center 34, and shaft 35 adjacent to such center is provided with a member 119 (Figure 3) having diametrically opposite recesses 120 therethrough for a pair of oppositely-disposed, conical-ended, slidable plungers 121 forced outwardly by springs 122, 122 bearing against a back plate 123. These plungers constitute drivers for the armature and its shaft and project slightly into holes 124 in a dog or drive member 125 having a split, tapered, threaded hub 126 held fast to the armature-shaft by a nut 127. Center 34 is merely a supporting member, whereas centers 121 are driving or revolving elements automatically forced out by their springs to compensate for any discrepancies in the adjustment of the member 125 on the shaft 118.

The opposite or left-hand end of the machine is exactly the same as that described, except that it has no drive-pulley 43, the driven armature shaft 118 revolving the left-hand shaft 35 and its adjustable balancing weights instead of vice versa, one driving pulley being sufficient for the whole machine as will be readily understood.

Each of the two vibratory or pendulum standards 106 at the two ends of the machine has extended through and swiveled to it at 134 (Figure 5) a screw-threaded adjustable rod 135 which projects forwardly through an aperture in the member 116. This swivel mounting is desirably constructed by rockingly mounting a nut 136 on oppositely extended pins 134 supported by the standard 106 and screwing the rod through such nut the desired distance.

The forward ends of these two adjustable rods 135, 135 spaced apart a considerable distance as illustrated, bear against the rear edge of a flat bar 137 (Figures 1 and 7) parallel to the armature-shaft 118, yieldingly mounted for sidewise play in two bearings 138, 138 on brackets 139, 139 rising from the front portion of the machine and adjustably held in place by securing screws 140, 140. Each bearing has two short opposed coil-springs 141, 142 pressing against the opposite front and rear edges of the bar 137, their action on the latter being capable of regulation or adjustment by turning a screw 143 against whose end one of the springs bears. These springs are so adjusted that the vibration of the bar will be in step with the natural vibration of the pendulum-structures. The more compression imposed on the springs the faster the period of vibration of the bar will be.

A cylindrical rod 144 (Figures 1 and 2) is fixed in one adjustable bearing 145 and slidable in an aligned stationary bearing 146, and adjustable lengthwise on this shaft and capable of being held in any desired position by a set-screw 147 is a support 148 carrying a movable indicator 149 actuated by a rearwardly-extended rod 150 (Figure 1) bearing on the front edge of the flat bar 137 (Figure 7). Part 148 also has an upstanding lug equipped with an index or arrow 151 (Figure 2) adjacent to and coacting with a transversely-inclined horizontal scale-bar 152 graduated equally in opposite directions from a central zero point 153. Such scale-bar is mounted on a shaft 154 adjustably slidable in bearings 155 of the brackets 139.

Also fixed in a bearing 156 (Figure 1) of the left-hand bracket and slidable in a registering bearing 157 of the companion bracket is a supporting-shaft 161 carrying two blocks 158 and 159 adjustably slidable thereon and capable of being held in adjusted position by their set-screws 160. Each of these two members 158 and 159 has a sharp-ended pointer rod 162 and 163, respectively, on a level with the axis of the tested body, slidingly mounted therein toward and from such body, each of the rods having a ball or knob head 164 by which it may be readily manipulated. The two elements have extensions 165 and 166 provided with arrows or indices 167 and 168, respectively, co-operating with the scale-bar.

At the right-hand portion of the machine a stationary pointer 169 (Figure 1) in register with the plane of centers of the weights 62 and 63 coacts with the scale-bar 152, and at the opposite end of the machine a complementary pointer 170 similarly in register with the plane of centers of the corresponding pair of weights is mounted on the slide 33 so as to also cooperate with the same scale-bar.

The driving mechanism for the pulley 43 and the other parts of the machine comprises bearings 180 and 181 (Figure 8), the former accommodating a shaft 182 and the latter such shaft and a sleeve 183 surrounding it, the sleeve at one end having a pulley 184 keyed thereto which is belted to a constant-speed electric-motor (not shown), the other end of the sleeve having a friction-clutch disc 185. A companion friction-clutch disc 186 has a hub 187 splined on but slidable lengthwise on the shaft and pressing against such hub is one end of a coiled spring 188 surrounding the shaft, the other end bearing against the head of a slotted sleeve 189 having a circularly grooved part 190 engaging which are pins 191 of a yoke 192 fulcrumed at 193 and having a lock or catch adapted to engage any one of a series of notches in a stationary toothed sector 194 fitted with a stop or abutment 195 to limit the extent of movement of lever 192.

Such sleeve 189 may be adjusted lengthwise the shaft to vary the pressure of the spring on the clutch-disc 186. A collar 196 surrounds sleeve 189 and is fixed to the shaft by a transverse pin 197 which extends out through the slots of the sleeve hence not interfering with the lengthwise movement of the latter on the shaft. To opposite ears of such collar arms 198 carrying weights 199 are hinged, each of such arms being connected by a link 200 to the disc member 186.

A pulley 201 at an end of shaft 182 is belted to the pulley 43 of shaft 35 and by this means the electric-motor rotates the body to be tested as will be readily understood.

By shifting the position of lever 192 and thus modifying the action of spring 188 on the slidable clutch-member, the speed of shaft 182 may be modified. The stop 195 is employed in such a position that the speed of rotation of shaft 182 will be that which is proper to rotate the shaft 118 and the tested armature 36 at a speed in synchronism with the natural period of vibration of the two pendulum-structures, whereby the unbalanced weight or weights of the armature is employed to produce a cumulative oscillatory effect on the pendulum-structures which is readily discernible.

This mechanism comprises a spring-loaded governor, wherein the greater the compression of the spring the higher the speed of rotation of the shaft. When all of the compression has been removed from the spring, the weights will revolve at the speed of the motor but there will be no turning effect on the balancing machine proper.

In this connection it may be noted that the natural period of vibration of either one of these pendulum-structures will be the same as that of a common suspended pendulum of a length equal to the difference between the radius of the top curved surface of the member 102 and the shorter radius of the bottom curved face of the element 103.

In an appliance of this kind the effective length of such a pendulum-structure is comparatively short because of the desirable high speed of rotation of the body undergoing test, for example:

A pendulum one metre long would have a time of vibration, that is the time of movement from one extreme position to the other, of approximately one second and the body undergoing test would have to revolve thirty times per minute to synchronize with such a period of vibration of such a pendulum, but most bodies must be dynamically balanced at a much higher speed, say two thousand revolutions per minute. It would be somewhat difficult to construct an effective suspended pendulum of such a short length to correspond to such a high speed of rotation, and accordingly the new type of pendulum-structure was devised.

The operation of the appliance is as follows: Assuming that the body to be tested and balanced is supported by its shaft on the centers 34 and that the parts 125 have been adjusted properly to the driving centers or points 121, it will be apparent that the rotation of the constant-speed electric-motor (not shown) is transmitted to shaft 35 and from that to the body 36 to be tested and from the latter to the shaft at the other end of the machine. Thus one driving means only is needed to secure the rotation of both balancing mechanisms as well as the body undergoing test. Assuming also that the two weights 62, 63 of each of the two sets are directly opposite one another and hence balanced, the zero graduations of their two scales 69 and 70 at each end of the machine will be in register indicating no effective weight in action.

While the tested body is being rotated at a relatively low speed, as determined by the position of lever 192, and with its two ends free to wabble independently of one another because supported on separate pendulum-structures, the operator shifts the element 148 along its supporting shaft until its vibration-indicator 149 shows that the point of least vibration has been reached, whereupon the set-screw 147 is tightened, thus locking the member 148 in such adjusted position.

Then the nut 95 at one end of the machine is turned to swing the corresponding weights 62 and 63 toward one another thereby unbalancing them and adding an effective unbalanced weight to the shaft. Handle 61 is also turned to swing such effective weight about the axis of the shaft to bring it to a position to balance at least in part the unbalanced weight of the corresponding end of the body undergoing test. These weights at both ends of the machine are thus manipulated both as to amount and position, and the speed of rotation increased from time to time until the unbalance of the body is completely neutralized or overcome. Whether or not such accurate or complete balance has been secured may be ascertained by placing the thumb or finger on the ends of the pins 117 and their adjacent or surrounding nuts 115 and by thus investigating the conditions of the pendulums a very accurate determination of the status of the body may be had. If the pendulums do not rock, the body is perfectly balanced. The final test speed of rotation of the body is in synchronism with the natural period of vibration of the pendulums when the handle 192 is against stop 195, the unbalanced weight or weights of the tested body follow-weight up the movements of the pendulum or pendulums in both directions and gradually multiplying such movements whereby a slight unbalance of the body may be easily magnified and detected by permitting it to act for some time on the pendulum and its effect on the latter becomes cumulative and easily ascertained.

Assuming that the body has been thus accurately balanced, and handle 192 is then moved back to off position thereby stopping the machine, scale-bar 152 is shifted or slid to bring its zero graduation into register with the index 151. Then pointer 169 will indicate on such scale the distance of the right-hand effective weight, composed of the two weights 62 and 63, from the center of the body about which its unbalanced weights tend to turn.

The zero index of scale 69 of the right-hand weights shows on scale 70 of the companion body the amount of such resultant weight which by the appliance has been imposed on the right-hand end of the body to balance such end, and the position of the same numerical reading on scale 69, which will be half-way between the zero of scale 69 and the numerical reading of such zero graduation on scale 70, will indicate the plane in which such weight must be added to or subtracted from the body to maintain such balance effect. As to whether the weight is to be added to or subtracted from the body depends upon which of the two parts of the scale, 180 degrees apart, is read. With some bodies the correcting weight should be added to and with others taken off of the body depending upon circumstances.

Pointer 163 is now slid along on its supporting shaft 164 until its sharp end is opposite an appropriate place on the armature 136 or other tested body for the application of or removal of such an amount of weight as will produce the proper balance. By means of mathematics or of a previously prepared chart, the amount of such unknown weight X is easily ascertained, taking into account the amount of weight indicated by the scales 69 and 70 and the distance on such scale by the index or arrow.

Having thus ascertained this weight and its linear and angular position, another unknown weight Y of an amount to put the armature in static balance, assuming that the weight X has been properly added to or removed from the armature, is calculated by taking into account the two effective test weights at the two ends of the machine and the weight X, and, having been established, the distance it should be from the graduation 153 is determined to correspond to and perform the function of the equivalent weight registered by the scales 69 and 70 at the left-hand end of the machine. The pointer 162 is then set at such distance, as displayed by index 167 on scale 152, and the body marked in the plane indicated by the scales 69 and 70 for the addition or subtraction of such weight.

After the two weights X and Y have been added to the body or subtracted therefrom at the points indicated by the pointers 162 and 163, taking into account, of course, the proper planes for such addition or subtraction as indicated by the two sets of scales 69 and 70, the armature will be in static and also in dynamic balance.

It is, of course, necessary to provide suitable means for advancing and retracting the slide 33 to facilitate the introduction of the work in the machine and to enable it to accommodate the bodies to be tested of different lengths. Accordingly the mechanism includes a screw-threaded shaft 202 rotatable in bearings 203 and provided at one end with a turning handle 204 on a reduced diameter portion 205 of the shaft. A coil expansion spring 206 surrounds such smaller portion of the shaft and bears at one end against the bearing 203 and at its other end against a shoulder of the shaft at the beginning of the screw-threaded portion. Additionally, the appliance includes a worm-gear 207 on a shaft 208 revoluble in one or more appropriately-supported bearings, the shaft being equipped with an accesible handle 210, and with one or more eccentrics 211 to operate a corresponding number of clamps 212 coacting with the same.

When it is desired to slide the member 33 and its associated parts to hold the body to be tested, the handle 210 is turned thus causing the slide 33 to travel by reason of the action of the gear 207 with the thread of the shaft with which it is constantly in mesh. When the parts have been brought to proper position further turning of the handle locks the slide to the frame by the one or more eccentric clamps. The screw-shaft may shift longitudinally slightly during this clamping action against the pressure of spring 206. Thus the slide may be shifted back and forth by the lever which also operates the clamps.

Although only one embodiment of the invention has been presented in this application and accompanying drawings, it is to be understood that it is susceptible of a variety of embodiments and that many minor mechanical changes may be made in the structure depicted without departure from the substance and essence of the invention and without the sacrifice of any of its substantial benefits and advantages. For the balancing of some bodies the double-ended structure of the kind shown and described is not esential and in such cases only one of the balancing appliances, such as is employed at either end of the present device, may be used with satisfactory results.

I claim:

1. A balancing testing machine of the character described including in combination an inverted pendulum-structure having a certain unresisted rocking movement, means to rotatably mount the body to be tested on said pendulum-structure, and means to rotate said body synchronously with the natural period of oscillation of said pendulum-structure.

2. A balancing testing machine of the character described including in combination an inverted pendulum-structure having a certain unresisted rocking movement, means to rotatably support the body to be tested at least in part on said pendulum-structure, and means to rotate said body synchronously with the natural period of oscillation of said pendulum-structure.

3. A balance testing machine of the character described including in combination, a plurality of independent inverted pendulum-structures each having a certain unresisted rocking movement, means to rotatably support the body to be tested on said pendulum-structures, and means to rotate said body synchronously with the natural period of oscillation of said pendulum-structures.

4. In a balancing-machine of the character described, the combination of an inverted pendulum-structure, means to revolve an unbalanced body, means to oscillate said pendulum-structure by the vibrations of said unbalanced body, an adjustable counterweight, and means to subject said body to the action of said counterweight while the machine is running, substantially as described.

5. In a balancing-machine of the character described, the combination of an inverted pendulum-structure having a natural period of oscillation due to the action of gravity and adapted to support an unbalanced body at least in part, means to rotate said unbalanced body, a counterweight, and means to subject said body to the action of the counterweight while the machine is running, substantially as described.

6. In a balancing-machine of the character described, the combination of a plurality of inverted pendulum-structures having a natural period of oscillation due to the action of gravity and adapted to conjointly support an unbalanced body at least in part, means to rotate said unbalanced body, a counterweight, and means to subject said body to the action of said counterweight while the machine is running, substantially as described.

7. In a balancing-machine of the character described, the combination of a pendulum-structure comprising a base-block with a concave upper surface, and a rocking-block with a convex lower surface of different curvature resting on and adapted to rock on the curved surface of said base-block, means to rotate an unbalanced body, and means tending to oscillate said rocking-block by impulses imparted thereto by said rotating body, substantially as described.

8. In a balancing-machine of the character described, the combination of a pendulum-structure comprising a base-block with a concave upper surface, and a rocking-block with a concave lower surface of different curvature resting on and adapted to rock on the curved surface of said base-block, means to rotate an unbalanced body synchronously with the natural period of vibration of said rocking-block, and means to impose the vibrations of said unbalanced rotating body on said rocking-block thereby tending to increase its amplitude of oscillation, substantially as described.

9. In a balancing-machine of the character described, the combination of a pendulum-structure comprising a base-block with a concave upper surface, and a rocking-block with a convex lower surface of different curvature resting on and adapted to rock on the curved surface of said base-block, means to rotate an unbalanced body supported at least in part by said rocking-block, and means to balance said body, substantially as described.

10. In a balancing-machine of the character described, the combination of a pendulum-structure comprising a base-block with a concave upper surface, and a rocking-block with a convex lower surface of different curvature resting on and adapted to rock on the curved surface of said base-block, means to rotate an unbalanced body supported at least in part by said rocking-block synchronously with the natural period of vibration of said rocking-block, and adjustable means to neutralize the unbalance of said body, substantially as described.

11. In a balancing-machine of the character described, the combination of a pair of pendulum-structures each comprising a base-block with a concave upper surface and a rocking-block with a convex lower surface of different curvature resting on and adapted to rock on the curved surface of said base-block, means to rotate an unbalanced body supported by said rocking-blocks synchronously with the natural period of vibration of said rocking-blocks, and means to neutralize the unbalance of said body, substantially as described.

12. In a balancing-machine of the character described, the combination of a shaft adapted to support the body to be tested at least in part, a bearing for said shaft permitting rocking thereof in the bearing, a pendulum structure, a bearing for said shaft on said pendulum structure, and means to rotate said shaft, substantially as described.

13. In a balancing machine of the character described, the combination of a shaft adapted to rotate the body to be tested, a bearing for said shaft permitting rocking thereof in the bearing, a pendulum-structure, a bearing for said shaft on said pendulum-structure, and means to rotate said shaft at a speed corresponding to the natural period of vibration of said pendulum-structure, substantially as described.

14. In a balancing-machine of the character described, the combination of a shaft adapted to support the body to be tested at least in part, a rockable bearing for said shaft, a pendulum-structure comprising a base-block with a curved surface and a rocking-block with a curved surface of different curvature resting on and adapted to rock on the curved surface of said base-block, a bearing for said shaft on said rocking-block, means to rotate said shaft at a speed corresponding to the natural period of vibration of said rocking-block, and means to neutralize the unbalance of said body, substantially as described.

15. In a balancing-machine of the character described, the combination of a shaft adapted to support the body to be tested at least in part, a rockable bearing for said shaft, a pendulum-structure, a bearing for said shaft on said pendulum-structure, means to rotate said shaft, and means to impose an adjustable unbalanced weight on said shaft, substantially as described.

16. In a balancing-machine of the character described, the combination of a shaft adapted to support the unbalanced body to be tested at least in part, a rockable bearing for said shaft, a pendulum-structure, a bearing for said shaft on said pendulum structure, means to rotate said shaft at a speed corresponding to the natural period of vibration of said pendulum structure, and means to impose and vary the amount of an unbalanced weight on said shaft, substantially as described.

17. In a balancing-machine of the character described, the combination of a shaft adapted to support at least in part the unbalanced body to be tested, a rockable bearing for said shaft, a pendulum-structure, a bearing for said shaft on said pendulum-structure, means to rotate said shaft and body to be tested, and means to impose and vary the amount of an unbalanced weight on said shaft during the rotation of the latter, substantially as described.

18. In a balancing-machine of the character described, the combination of a shaft adapted to support at least in part the body to be tested, a rockable bearing for said shaft, a pendulum-structure, a bearing for said shaft on said pendulum-structure, means to rotate said shaft, means to impose and vary the amount of an unbalanced test weight on said shaft, and means to indicate the variable amount of such weight imposed on said shaft, substantially as described.

19. In a balancing-machine of the character described, the combination of a shaft adapted to support at least in part the unbalanced body to be tested, a rockable bearing for said shaft, a pendulum-structure, a bearing for said shaft on said pendulum-structure, means to rotate said shaft, means to impose and vary the amount of an unbalanced test weight on said shaft, and means to indicate the angular plane of said test weight, substantially as described.

20. In a balancing-machine of the character described, the combination of a shaft adapted to support at least in part the unbalanced body to be tested, a rockable bearing for said shaft, a pendulum-structure, a bearing for said shaft on said pendulum-structure, means to rotate said shaft at a speed corresponding to the natural period of vibration of said pendulum-structure, means to impose and vary the amount of an unbalanced test weight on said shaft, means to indicate the variable amount of such test weight imposed on said shaft, and means to indicate the angular plane of said test weight, substantially as described.

21. In a balancing-machine of the character described, the combination of a shaft adapted to support at least in part an unbalanced body to be tested, a rockable bearing for said shaft, a pendulum-structure, a bearing for said shaft on said pendulum-structure, means to rotate said shaft, a pair of normally-balanced test weights on said shaft, means to move said weights angularly relatively to one another to impose and vary a resultant unbalanced weight on said shaft, substantially as described.

22. In a balancing-machine of the character described, the combination of a shaft adapted to support at least in part the unbalanced body to be tested, a rockable bearing for said shaft, a pendulum-structure, a bearing for said shaft on said pendulum-structure, means to rotate said shaft, a pair of normally-balanced test weights on said shaft, means to move said weights angularly relatively to one another about the axis of the shaft to impose and vary the amount of the resultant weight on said shaft, means to move said weights angularly about the axis of said shaft without disturbing their relation to one another, and indicator means associated with said weights, substantially as described.

23. In a balancing-machine of the character described, the combination of a shaft adapted to support at least in part the unbalanced body to be tested, a rockable bearing for said shaft, a pendulum-structure, a bearing for said shaft on said pendulum-structure, means to rotate said shaft at a speed corresponding to the natural period of vibration of said pendulum-structure, a pair of normally-balanced test weights on said shaft, means to move said weights angularly relatively to one another about the axis of the shaft to impose and vary the amount of the resultant weight on said shaft, means to move said weights angularly about the axis of the shaft without disturbing their relation to one another, and means to indicate the amount and angular position of the resultant unbalanced test weight, substantially as described.

24. In a balance testing machine of the character described, the combination of a shaft adapted to support the body to be tested at least in part, a pendulum-structure, a bearing for said shaft on said pendulum-structure, means to rotate said shaft and body, a variable test weight, means associating said weight with said shaft, and means to adjust said weight angularly about the axis of the shaft during the rotation of the latter.

25. In a balance testing machine of the character described, the combination of a shaft adapted to support the body to be tested at least in part, a pendulum-structure, a bearing for said shaft on said pendulum-structure, means to rotate said shaft and body at a speed corresponding to the natural period of vibration of said pendulum structure, a variable test weight, means associating said weight with said shaft, and means to adjust said weight angularly about the axis of the shaft during the rotation of the latter.

26. In a balancing-machine of the character described, the combination of a shaft adapted to support at least in part and to rotate the unbalanced body to be tested, a pendulum-structure, a bearing for said shaft on said pendulum-structure, means to rotate said shaft at a speed corresponding to the natural period of vibration of the pendulum-structure, means to impose and vary the amount and position of an unbalanced test weight on said shaft, and means to indicate the amount and position of such test weight, substantially as described.

27. In a balancing-machine of the character described, the combination of a pair of pendulum-structures, means to support the opposite ends of an unbalanced body to be tested on said structures, means to rotate said body, and test weights adjustable during the rotation of the body to neutralize the unbalance of said body during its rotation, substantially as described.

28. In a balancing-machine of the character described, the combination of a pair of pendulum-structures, means to support the opposite ends of an unbalanced body to be tested on said structures, means to rotate said body at a speed corresponding to the natural period of vibration of said pendulum-structures, and test weights adjustable during the rotation of the body to neutralize the unbalance of said body during its rotation, substantially as described.

29. In a balancing-machine of the character described, the combination of a pendulum-structure, a shaft associated with said structure and adapted to transmit its transverse vibrations thereto, means to revolve said shaft, a pair of equal test weights mounted on said shaft, and means to adjust both of said weights simultaneously and equally toward and from one another angularly about said shaft, substantially as described.

30. In a balancing-machine of the character described, the combination of a pendulum-structure, a shaft associated with said structure and adapted to transmit its transverse vibrations thereto, means to revolve said shaft, a pair of equal test weights mounted on said shaft, means to adjust both of said weights simultaneously and equally toward and from one another angularly about said shaft, and means to adjust both of said weights angularly about said shaft without disturbing their relation to one another, substantially as described.

31. In a balancing-machine of the character described, the combination of a pendulum-structure, a shaft associated with said structure and adapted to transmit its transverse vibrations thereto, means to revolve said shaft at a speed synchronous with the natural period of vibration of said pendulum-structure, a pair of equal test weights mounted on and in the same plane transverse to said shaft, means to adjust both of said weights simultaneously and equally toward and from one another angularly about and during the rotation of said shaft, and means to adjust both of said weights angularly about said shaft without disturbing their relation to one another, substantially as described.

32. In a balancing-machine, the combination of a shaft, means to revolve said shaft, test weights mounted on said shaft, means to adjust said weights relatively to one another, and means to automatically take up the loose motion between said weights, substantially as described.

33. In a balancing-machine, the combination of a shaft, means to revolve said shaft, test weights mounted on said shaft, means to adjust said weights relatively to one another around said shaft, and balanced spring means to automatically take up the loose motion between said weights, substantially as described.

34. In a balancing-machine, the combination of two normally coaxial shafts spaced apart and adapted to support the body to be tested between them, pendulum mountings for said shafts permitting the latter to vibrate transversely, means to revolve said shafts and body, and means on said shafts to neutralize the unbalance of said body, substantially as described.

35. In a balancing-machine, the combination of spaced mountings for supporting the opposite ends of the unbalanced body to be tested permitting such ends to wabble, means to revolve said body, a vibratory-bar, means to transmit the lateral movements of said mountings to said bar, and means slidable along said bar adapted to determine its point of least vibration, substantially as described.

36. In a balancing-machine, the combination of spaced pendulum mountings for supporting the opposite ends of the unbalanced body to be tested permitting such ends to wabble, means to revolve said body, a vibratory-bar, means to transmit the lateral movements of said mountings to said bar, and adjustable means cooperating with said bar and adapted to determine its points of least vibration, substantially as described.

37. In a balancing-machine, the combination of a pair of generally-coaxial shafts space apart adapted to support the unbalanced body to be tested between them, pendulum mountings for said shafts permitting their transverse vibration, means to revolve said shafts and body, adjustable test-weight means on each shaft, a vibratory-bar, means to transmit the vibrations of said shafts thereto, means adjustable along said bar adapted to determine its point of least vibration, an index associated with said adjustable means, indices associate with said test-weight means, and a graduated scale cooperating with said three indices, substantially as described.

38. In a balancing-machine, the combination of a pair of generally-coaxial shafts spaced apart adapted to support between them the unbalanced body to be tested, pendulum mountings for said shafts permitting their transverse vibration, means to revolve said shafts and body, adjustable test-weight means on each shaft, a vibratory-bar, means to transmit the vibrations of said shafts thereto, means adjustable along said bar adapted to determine its point of least vibration, an index associated with said adjustable means, indices associated with said test-weight means, and a scale cooperating with and adjustable relatively to said three indices and graduated in opposite directions from an intermediate point, substantially as described.

39. In a balancing-machine, the combination of a pair of generally-coaxial shafts spaced apart adapted to support between them the unbalanced body to be tested, pendulum mountings for said shafts permitting their transverse vibration, means to revolve said shafts and body, adjustable test-weight means on each shaft, a vibratory-bar, means to transmit the vibrations of said shaft thereto, means adjustable along said bar adapted to determine its point of least vibration, an index associated with said adjustable means, a graduated scale cooperating with said index, a pair of adjustable pointers, and an index on each of said pointers cooperating with said scale, substantially as described.

40. In a balancing-machine, the combination of a pair of generally-coaxial shafts spaced apart adapted to support between them the unbalanced body to be tested, pendulum mountings for said shafts permitting their transverse vibration, means to revolve said shafts and body, adjustable test-weight means on each shaft, a vibratory-bar, means to transmit the vibrations of said shafts thereto, means adjustable along said bar adapted to determine its point of least vibration, an index associated with said adjustable means, indices associated with said test-weight means, a scale cooperating with and adjustable relatively to said three indices and graduated in opposite directions from an intermediate point, a pair of adjustable pointers, and an index on each of said pointers coacting with said scale, substantially as described.

41. In a balancing-machine of the character described, the combination of means to support the body to be tested with its ends capable of independent vibration, means to rotate said body, adjustable weights to independently neutralize the tendency to vibration of the opposite ends of the body, means adjustable lengthwise the body to ascertain its point of least vibration, and means to indicate the distances between said least vibration point and said weights, substantially as described.

GUSTAVE T. JOHNSON.